United States Patent Office 2,845,432
Patented July 29, 1958

---

2,845,432

BENZAMIDO AND ACETAMIDO 4-AMINO-3-ISOXAZOLIDONES AND ALKYLATED DERIVATIVES

Frederick A. Kuehl, Jr., Rumson, N. J., assignor to Merck & Co., Inc., Rahway, N. J., a corporation of New Jersey No Drawing. Application December 23, 1954
Serial No. 477,399

4 Claims. (Cl. 260—307)

This invention relates to novel chemical compounds and particularly to novel compounds useful as intermediates in the synthesis of 4-amino-3-isoxazolidone and its derivatives.

It has now been found that 4-amino-3-isoxazolidone compounds can be synthesized by reactions indicated as follows:

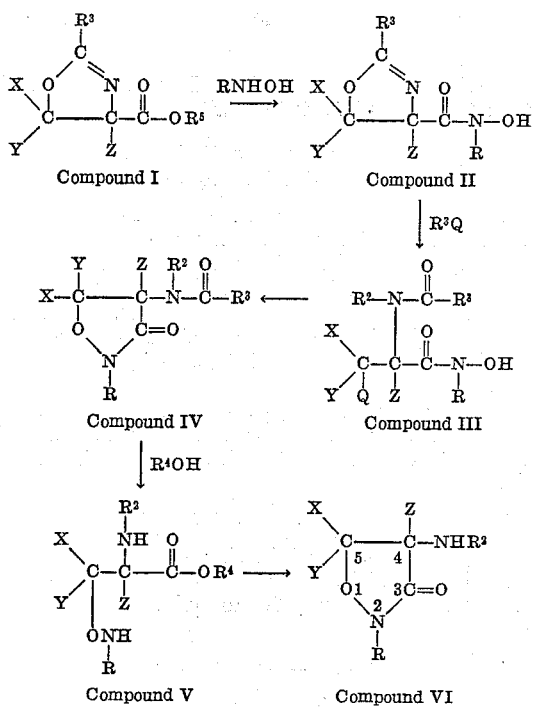

In the above formulae X, Y, and Z are hydrogen or alkyl, aralkyl or aryl groups containing from one to eight carbon atoms and may be the same or different groups; R and $R^2$ are hydrogen or alkyl or aralkyl groups containing from one to eight carbon atoms and may be the same or different groups; $R^3$ is an alkyl, aryl, or aralkyl group containing from one to eight carbon atoms and may be the same or different groups, $R^4$ and $R^5$ are alkyl groups containing from one to eight carbon atoms and may be the same or different groups, and Q is a bromo, chloro, or iodo group.

The reactions indicated are conducted as follows: a 4-carboalkoxy-2-oxazoline compound (compound I) is reacted with a hydroxylamine in the presence of a base to produce a 4-carbohydroxamido-2-oxazoline compound (compound II). This latter compound is then reacted with an ionizable halide compound to form a β-halopropionohydroxamic acid compound (compound III) which when treated with a base cyclizes to form a 4-amido-3-isoxazolidone compound (compound IV). This compound is then reacted with an alcohol under acidic conditions to produce an α-amino-β-aminoxypropionate compound (compound V) which is treated with a base to form a 4-amino-3-isoxazolidone compound (compound VI).

This invention is concerned with the 4-amino-3-isoxazolidone compound (compound IV), an intermediate in the above synthesis, which has the formula:

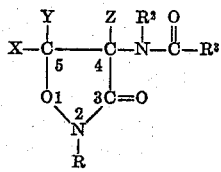

wherein X, Y, Z, R, $R^2$, and $R^3$ are as defined above.

The 4-amido-3-isoxazolidone compound is prepared by treating the β-halopropionohydroxamic acid compound with a base. The base is preferably a water-soluble base, such as one of the alkali metal hydroxides. Other bases may be used however, such as alkali metal alkoxides, such as sodium methoxide, potassium ethoxide, sodium ethoxide, or sodium propoxide. The reaction is preferably carried out in a solvent, such as any water-soluble alcohol or ether, as for example, ethanol, n-propanol, tetrahydrofuran or dioxane. The reaction proceeds most favorably at a temperature of about 20° C. to about 100° C. The product is isolated by the addition of a mineral acid, such as hydrochloric acid, hydrobromic acid, or sulfuric acid, and extraction into a water-immiscible solvent, as for example, chloroform, methylene chloride, benzene, or ether. The organic extract is then concentrated and allowed to cool with formation of the crystalline product. Typical examples of the 4-amido-3-isoxazolidone compounds are 4-benzamido-3-isoxazolidone; 4-acetamido-3-isoxazolidone; 4-benzamido-5-methyl-3-isoxazolidone; 4-(N-benzylbenzamido)-3-isoxazolidone; and 2-methyl-4-benzamido-3-isoxazolidone.

The 4-amino-3-isoxazolidones are useful as bactericidal and/or bacteriostatic agents. They are also of value as growth promoting agents in animals. These compounds may also prove to be useful in topical application since they appear to have pronounced activity against a large number of both gram-positive and gram-negative bacteria. In this regard it should be noted that the DL form of 4-amino-3-isoxazolidone has shown about ten times the activity of the D isomer against *D. pneumoniae*. The compounds are also useful for combating bacterial diseases in plants and trees.

The following examples are given for purposes of illustration:

EXAMPLE 1

*DL-4-benzamido-3-isoxazolidone*

To a solution of 4.0 grams (0.0165 mole) of α-benzamido-β-chloropropionohydroxamic acid in about 30 ml. of hot methanol was added dropwise from a burette 31.5 ml. of 1.0 N sodium hydroxide (0.0315 mole). The solution was heated to 60° C. for a few minutes. It was then cooled, 4.2 ml. of 1.16 N hydrochloric acid (.0165 mole) was added, and the solution was immediately extracted with one 100-ml. portion and five 50-ml. portions of chloroform. The combined chloroform extracts were concentrated to about 225 ml., filtered and further concentrated to about 200 ml. Crystallization began and after the mixture was cooled, 2.07 grams of 4-benzamido-3-isoxazolidone, melting point 167–170° C., was collected on a filter. Another crop brought the crude yield to 2.54 grams (74.5%), and an analytical sample melted at 165–168° C.

*Analysis.*—Calcd.: C, 58.24; H, 4.89; N, 13.59. Found: C, 58.45; H, 4.70; N, 13.37.

EXAMPLE 2

DL-4-benzamido-3-isoxazolidone

Two-hundred and six grams crude 2-phenyl-4-carbohydroxamido-2-oxazoline (1 mole) was placed in a ten-liter Morton flask equipped with stirrer, thermometer and one-liter dropping funnel, 2500 cc. dioxane was added followed by 2.5 cc. water, the suspension was heated to 95° C. with gentle stirring, then 1080 cc. dioxane containing 38.0 grams hydrogen chloride [1.04 mole, 0.035 gram hydrogen chloride per cc.] was added dropwise over a period of 100 minutes at 95–98° C. with very rapid stirring. The mixture was stirred another fifteen minutes at 95–98° C. during which time the reddish color changed to yellowish. The hot reaction mixture was sucked into a regular five-liter flask and concentrated in vacuo to a crystalline mush of α-benzamido-β-chloropropionohydroxamic acid.

The residue was suspended in 2000 cc. water, warmed to 50° C., then 1060 cc. 1.98 N sodium hydroxide (84 grams sodium hydroxide, 2.1 moles) was added dropwise at 50–55° C. over a period of 70 minutes with stirring. The solution was chilled in brine to 10° C., 700 cc. 2 N hydrochloric acid was added (pH about 2), then extracted as rapidly as possible twice with two liters followed by five times with one liter of ethyl acetate. The combined extracts were warmed to 40–45° C. to dissolve some crystalline matter, dried over magnesium sulfate treated with 10 grams Darco and filtered. The clear filtrate was concentrated in vacuo to about 1.5 liters (crystals began to appear early during the concentration). The concentrate was chilled to 0° C. overnight, the solid was filtered, washed three times with 80 cc. ice-cold ethyl acetate and air-dried at 50° C. Yield 108 grams first crop, melting point 164–167° C. The filtrate was concentrated to 250 cc., chilled at 0° C. overnight, filtered and washed three times with 20 cc. cold ethyl acetate; yield 20 grams second crop, melting point 159–163° C. After concentrating to 150 cc. and cooling, a third crop of two grams was isolated, melting point 160–163° C. Total yield 130 grams crude DL-4-benzamido-3-isoxazolidone (63% of theory).

Five-hundred and seventy grams crude product was treated with 25.6 liters hot ethyl acetate, suitably divided in twelve-liter flasks, simmering the mixture on the steam bath for several minutes; the insoluble crystals (plates) exhibited a characteristic sheen. The hot mixture was allowed to cool to 55° C., then filtered at once. The insoluble material amounted to 50.6 grams (8.8%), melting point 160–163° C. The filtrate was chilled at 0° C. overnight (crystallization does not commence until room temperature is approached). The cottony crystal mass was filtered off, washed twice with 750 cc. ice-cold ethyl acetate and air-dried at 40–50° C. Yield 355 grams, melting point 170–171° C.

The combined filtrate and washings were concentrated in vacuo to about 4.3 liters, chilled at 0° C. overnight, filtered, washed twice with 150 cc. ice-cold ethyl acetate and dried. Yield 121 grams, melting point 171–172° C. After concentrating in vacuo to 500 cc., chilling, another crop of 16 grams of crystals was obtained, melting point 168–169° C. Total yield of satisfactory material 492 grams (86.3%). Calcd. for $C_{10}H_{10}O_3N$: C, 58.25; H, 4.89; N, 13.58. Found: C, 58.38; H, 5.30; N, 13.30.

EXAMPLE 3

4-amino-5-methyl-3-isoxazolidone

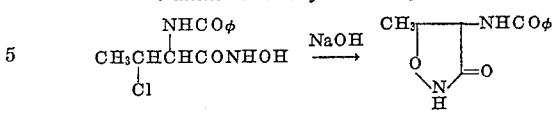

To a stirred slurry of 6.40 grams (0.025 mole) of α-benzamido-β-chlorobutyrohydroxamic acid in 100 ml. of water heated to 65–75° C. was added in one hour sufficient (46 ml., 183%) .99 N sodium hydroxide to give a permanent phenolphthalein end point. The solution was cooled in an ice-bath and to it 21.4 ml. of 1.16 N (0.025 mole) hydrochloric acid was added. The acidic solution was extracted with five 250-ml. portions of chloroform and the combined dried extracts concentrated to approximately 225 ml. The crystalline precipitate, 3.32 grams, melting point 188–194° C. was collected on a filter. The filtrate on concentration yielded another 1.02 grams, melting point 187–192° C., bringing the total yield to 4.34 grams (79%). A small sample recrystallized from chloroform melted at 187–190° C.

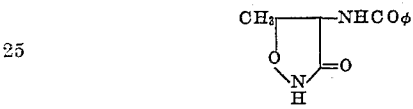

*Analysis.*—Calcd.: C, 59.99; H, 5.49; N, 12.72. Found: C, 59.62; H, 5.14; N, 12.56.

EXAMPLE 4

D-4-acetamido-3-isoxazolidone

A suspension of 101 mg. of D-4-amino-3-isoxazolidone in 20 ml. of anhydrous methanol was treated with 0.1 ml. of acetic anhydride. After standing for a short time at room temperature the clear solution was concentrated at reduced pressure to a crystalline residue. After several recrystallizations from ethanol D-4-acetamido-3-isoxazolidone melted at 175–177° C., $[\alpha]_D^{25} = +73$ (1% in water).

*Analysis.*—Calcd. for $C_3H_5N_2O_2(CH_3CO)$: C, 41.67; H, 5.59; N, 19.37; mol. wt. 144. Found: C, 41.96; H, 5.25; N, 19.47; mol. wt. 148 (ebullioscopic in autonitrile).

Any departure from the above description which conforms to the present invention is intended to be included within the scope of the claims.

What is claimed is:

1. A compound having the formula:

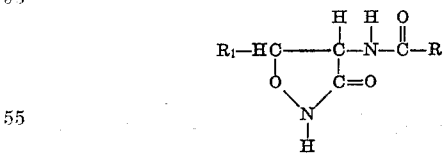

wherein R is a member from the group consisting of phenyl and methyl and $R_1$ is a member from the group consisting of hydrogen and lower alkyl.

2. 4-benzamido-3-isoxazolidone.
3. 4-benzamido-5-methyl-3-isoxazolidone.
4. 4-acetamido-3-isoxazolidone.

References Cited in the file of this patent

FOREIGN PATENTS 715,362       Great Britain _____ Sept. 15, 1954